US009985483B2

(12) United States Patent
Ouyang et al.

(10) Patent No.: US 9,985,483 B2
(45) Date of Patent: May 29, 2018

(54) ELECTRO-DYNAMIC MACHINE, SYSTEM AND METHOD

(71) Applicant: ABB Technology AG, Zurich (CH)

(72) Inventors: Wen Ouyang, Apex, NC (US); Varagur Ramanan, Cary, NC (US)

(73) Assignee: ABB Schweiz AG, Baden (CH)

( * ) Notice: Subject to any disclaimer, the term of this patent is extended or adjusted under 35 U.S.C. 154(b) by 191 days.

(21) Appl. No.: 15/163,364

(22) Filed: May 24, 2016

(65) Prior Publication Data
US 2017/0346352 A1    Nov. 30, 2017

(51) Int. Cl.
*H02K 1/06* (2006.01)
*H02K 1/14* (2006.01)

(52) U.S. Cl.
CPC .................... *H02K 1/146* (2013.01)

(58) Field of Classification Search
CPC ........ H02K 29/03; H02K 1/146; H02K 1/165; H02K 1/14; H02K 2201/03; H02K 3/522; H02K 1/265; H02K 2205/12; H02K 5/24
USPC .... 310/216.092–216.093, 216.096, 216.104, 310/216.069–216.074, 51
See application file for complete search history.

(56) References Cited

U.S. PATENT DOCUMENTS

| | | | |
|---|---|---|---|
| 4,516,048 A | 5/1985 | Brigham | |
| 4,758,756 A | 7/1988 | Pouillange | |
| 4,959,605 A | 9/1990 | Vaidya | |
| 6,005,321 A | 12/1999 | Bolton et al. | |
| 6,426,602 B1 | 7/2002 | McCann et al. | |
| 7,923,887 B2 | 4/2011 | Nakagawa | |
| 8,022,587 B2 | 9/2011 | Hoppe | |
| 2004/0245887 A1 | 12/2004 | Fujinaka | |

(Continued)

FOREIGN PATENT DOCUMENTS

CN    201110444008    12/2011

OTHER PUBLICATIONS

Search Report and Written Opinion, PCT Appln. No. PCT/US17/034253, Oct. 10, 2017, 11 pgs.

(Continued)

*Primary Examiner* — Thanh Lam
(74) *Attorney, Agent, or Firm* — Target Stettinius & Hollister LLP

(57) ABSTRACT

One embodiment is a unique Vernier machine comprising a rotor and a stator. The rotor comprises a back portion and a plurality of permanent magnets. The stator comprises a plurality of ferromagnetic arm structures, a plurality of ferromagnetic pole structures extending from each of the ferromagnetic arm structures in a direction toward the permanent magnets, and a plurality of conductive windings disposed about respective ones of the plurality of ferromagnetic arm structures. The ferromagnetic pole structures are structured to collect magnetic flux from the permanent magnets. The ferromagnetic pole structures of each of said ferromagnetic arm structures are spaced apart from one another according to a non-uniform pattern such that the ferromagnetic pole structures of a given ferromagnetic arm structure have substantially the same angular position relative to the permanent magnets radially opposite from the ferromagnetic pole structures of the given ferromagnetic arm structure.

25 Claims, 6 Drawing Sheets

(56) References Cited

U.S. PATENT DOCUMENTS

| | | | |
|---|---|---|---|
| 2006/0290225 A1* | 12/2006 | Mipo | H02K 1/16 |
| | | | 310/187 |
| 2008/0136285 A1* | 6/2008 | Tajima | G11B 17/028 |
| | | | 310/216.017 |
| 2009/0160287 A1* | 6/2009 | Nakagawa | H02K 1/146 |
| | | | 310/216.057 |
| 2009/0174277 A1 | 7/2009 | Mueller et al. | |
| 2009/0237021 A1 | 9/2009 | Yamamoto et al. | |
| 2015/0139830 A1* | 5/2015 | Nigo | H02K 21/16 |
| | | | 417/410.1 |

OTHER PUBLICATIONS

S. Chung et al., "Fractional Slot Concentrated Winding Permanent Magnet Synchronous Machine with Consequent Pole Rotor for Low Speed Direct Drive," IEEE Trans. Magn., vol. 48, No. 11, pp. 2965-2968, 2012.

S. Niu et al., "A Novel Direct-Drive Dual-Structure Permanent Magnet Machine," IEEE Trans.Magn., vol. 46, No. 6, pp. 2036-2039, 2010.

L. Wang et al., "Development of a Magnetic-Geared Permanent-Magnet Brushless Motor," IEEE Trans. Magn., vol. 45, No. 10, pp. 4578-4581, 2009.

C.H. Lee, "Vernier Motor and its Design," in Proc. IEEE Winter General Meeting, pp. 343-348, 1963.

A. Toba et al., "Generic Torque-Maximizing Design Methodology of Surface Permanent-Magnet Vernier Machine," IEEE Trans. Industry Appl., vol. 36, No. 6, pp. 1539-1546, 2000.

\* cited by examiner

ELECTRO-DYNAMIC MACHINE, SYSTEM AND METHOD

STATEMENT OF GOVERNMENT INTEREST

The subject matter disclosed in this patent application was developed under U.S. Department of Energy Contract No. DE-EE0006400. The U.S. Government has certain rights in the invention.

BACKGROUND

The present disclosure relates generally to Vernier-type electro-dynamic machines and similar electrical machines. Vernier-type machines may utilize magnetic flux harmonics to transfer energy between a stationary component and a movable component. Such machines are known to be suitable for certain low speed and high torque applications. Existing systems suffer from a variety of drawbacks, shortcomings and disadvantages. There remains a significant unmet need for the unique apparatuses, methods and systems disclosed herein.

DISCLOSURE OF EXEMPLARY EMBODIMENTS

For the purposes of clearly, concisely and exactly describing exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique electrical machine including a first electro-dynamic component having permanent magnet pole pairs, and a second electro-dynamic component having teeth structured to form magnetic modulation poles magnetically linking the first electro-dynamic component with the second electro-dynamic component for operation as a motor or a generator. Further embodiments, forms, objects, features, advantages, aspects, and benefits shall become apparent from the following description and drawings.

DETAILED DESCRIPTION OF ILLUSTRATIVE EMBODIMENTS

Figure 1:
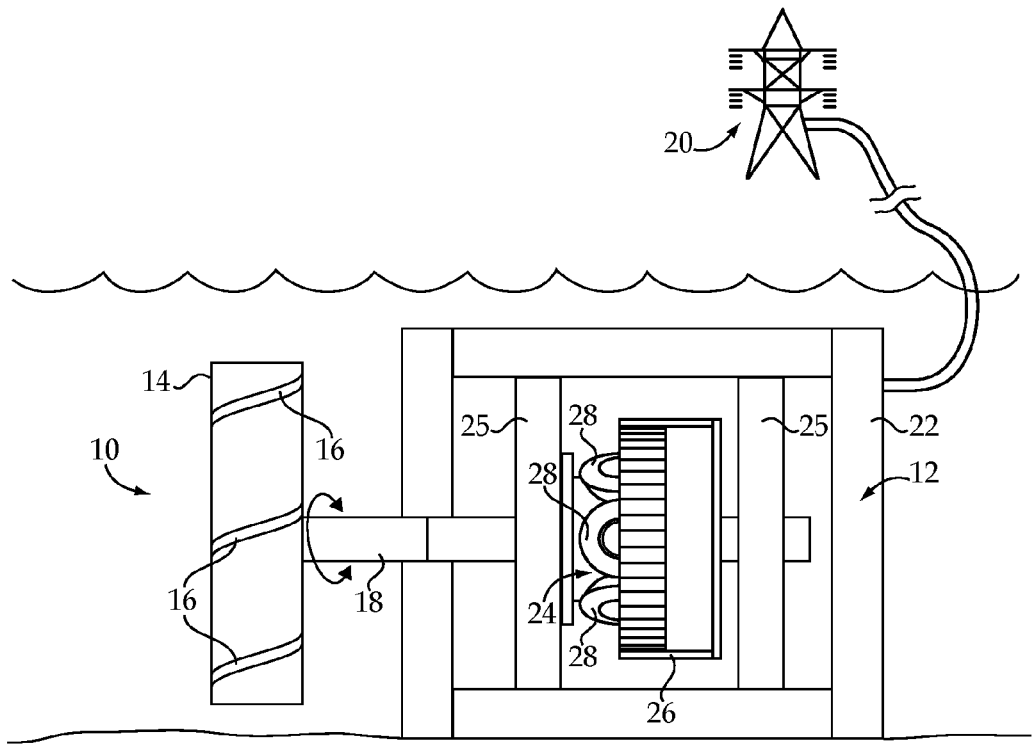
FIG. 1 illustrates an electro-dynamic machine system according to one embodiment.

Referring to FIG. 1, there is shown an electro-mechanical machine system 10 including an electrical machine 12. Electrical machine 12 may be structured to rotate components to be described in response to rotation of an external rotary input mechanism 14 coupled with electrical machine 12 by way of an input shaft 18. In the illustrated embodiment, electrical machine 12 is positioned on the sea floor with internal components located within a watertight housing 22. Input shaft 18 extends through housing 22, and is coupled with rotary input mechanism 14. Rotary input mechanism could include a variety of different configurations, including blades 16 structured to induce rotation of input shaft 18 in response to the action of ocean waves, currents or the like. Depending upon the service environment of system 10, input mechanism 14 could be rotated by incoming waves, and then counter-rotated by outgoing waves, for instance. In other implementations, input mechanism 14 could be rotated in response to currents, such as tidal currents, continuous river currents, or any other environment where water or potentially air impinging upon mechanism 14 can induce rotation of input shaft 18.

Those skilled in the art will thus appreciate a variety of different applications for system 10, where turbines, water wheels, or reciprocating paddles moveable in response to wave action are available as a power source. In still other ocean applications, input mechanism 14 might not rotate as such, but could operate to convert translational motion into rotary motion. The foregoing examples represent instances where machine system 10 can be used for the generation of electrical power. To this end, system 10 is shown connected with an electrical grid 20 that is land based. It should be appreciated that system 10 is not strictly limited to electrical generation applications, and embodiments are contemplated where system 10 operates as an electrical motor in at least part of its duty cycle. Still further embodiments are contemplated wherein, rather than a rotary electrical machine system the teachings herein are applied to linear motors or generators. Electrical machine 12 may be a Vernier-type electrical machine, and as will be further apparent from the following description is contemplated to provide certain advantages over known strategies, such as in relation to increased generator power output, improved generator power factor at a given power output compared with convention Vernier-type permanent magnet generators, reduced torque ripple, and improved overall efficiency and power density as compared with conventional systems. As further discussed herein, these and other advantages are available at least in part because of enhanced flux linkage between electro-dynamic components and thus improved flux collection during operation based upon specialized arrangements of modulation poles in machine 12.

FIG. 1 also illustrates mounts 25 within housing 22, with mounts 25 rotatably supporting shaft 18 or rotatable components coupled to rotate with shaft 18. A stator 24 is positioned between mounts 25, and has mounted thereon a plurality of windings 28. A rotor 26, including a back portion and a plurality of permanent magnets coupled to the backing, is positioned about stator 24 and coupled to rotate with shaft 18 by way of conventional hardware not visible in FIG. 1. Input shaft 18 or related components thus extends through stator 24, and rotor 26 is an outer rotor. Embodiments are contemplated where a stator is an outer component, and rotor is an inner component. System 10 may also include suitable cabling and/or power conversion equipment to convert electrical current produced in windings 28 in response to the rotation of rotor 26 into useable electrical power, for transmission to grid 20 or potentially for use locally. In the illustrated embodiment rotor 26 is structured to surround stator 24. It shall be appreciated however that different configurations are also contemplated, for example, in certain embodiments the stator may surround the rotor.

Those skilled in the art will be familiar with certain of the challenges relating to electrical power production in relatively low fluid-velocity environments, among them the difficulty in some instances of producing electrical power at sufficient voltage for transmission, or conversion to voltages high enough for efficient transmission of electrical power. For instance, in ocean wave environments, wave speed might produce rotation of input mechanism 14 at only a few revolutions per minute. Engineers have found it difficult to step up voltage produced at such low RPMs with conventional equipment without losing an unacceptable amount of the energy potentially otherwise available. While gear boxes have been proposed and implemented in at least research environments to amplify the natural wave frequency to produce higher RPMs the friction losses associated with gear boxes and the like are generally undesirable. Moreover, in a sea floor environment it is desirable for equipment servicing to be minimized, and both the risk of having to service under sea gear boxes and the precautions needed to attempt to seal such equipment from sea water intrusion, make such apparatus generally undesirable. System 10 can therefore provide a desirable mechanism for converting relatively slow speed ocean waves, potentially reciprocating movement to electrical power for supplying an electrical grid. As alluded to above, however, the present disclosure is not thereby limited and applications outside of power generation and outside of ocean wave power generation are contemplated.

Figure 2:
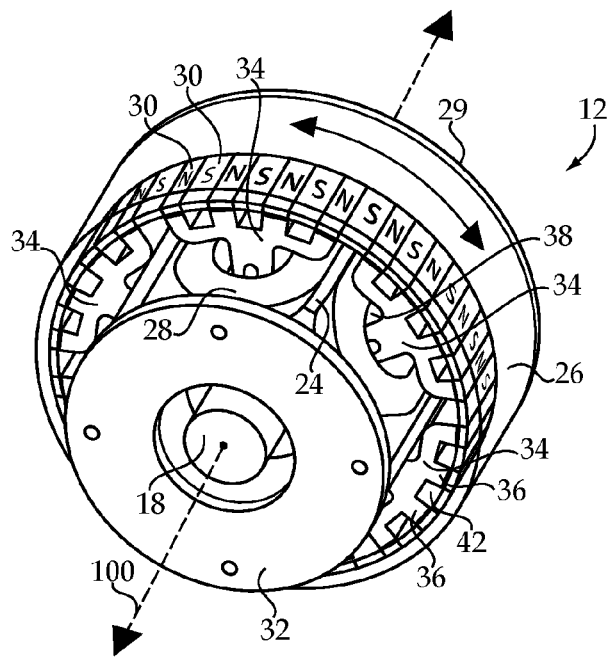
FIG. 2 illustrates an assembly of a rotor and stator suitable for use in the system of FIG. 1.

Referring also now to FIG. 2, there is shown a view of the assembly of stator 24 and rotor 26 in illustrating additional details. Stator 24 is shown including or coupled with a mounting flange 32, suitable for bolting or otherwise coupling the assembly of stator 24 and rotor 26 to supports or mounts 25. Shaft 18 can extend through stator 24 for coupling on a backside of stator 24 and rotor 26 to rotor 26 for inducing rotation thereof. A simple end plate 29 could be used as part of a frame for stator 26 that rotates with shaft 18. Mounted to end plate or frame 29 are a plurality of permanent magnets 30 arranged with alternating polarity so as to form a plurality of pole pairs in a generally conventional manner known from the field of Vernier-type machines. Stator 24 includes a plurality of stator arms 34. Stator arms 34 project radially outward from a stator core 38, and each of arms 34 including a plurality of teeth 36.

Teeth 36 may be separated one from the other by tooth gaps 42. Windings 28 can be seen to extend around arms 34, also in a generally conventional manner. In a practical implementation strategy, machine 12 may be structured for operation with 3-phase electrical power, with windings dedicated to the separate phases in a generally conventional manner. The present disclosure is not thereby limited, however, and other forms of electrical power and phasing could be produced or used.

Figure 3:
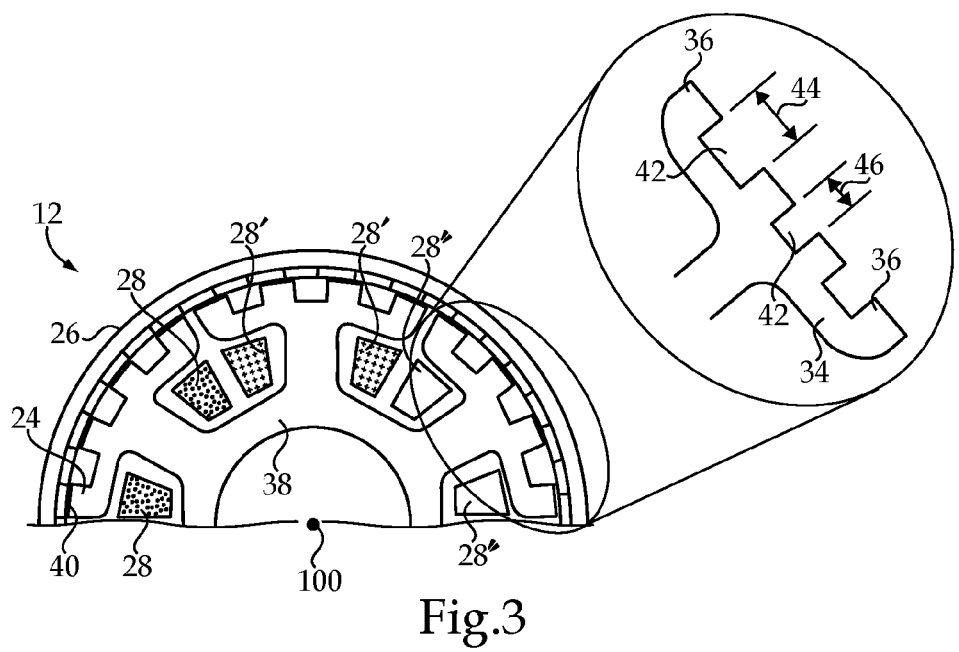
FIG. 3 is a diagrammatic illustration of an arrangement of components in the assembly of FIG. 2, and including a detailed enlargement.

Referring also now to FIG. 3, there is shown diagrammatically additional features of machine 12, and in particular including a detailed enlargement showing features of tooth spacing. FIG. 3 also illustrates several windings 28, 28', 28", and counterpart windings for each of these windings that are not numbered. The different windings are identified by way of consistent stippling in the FIG. 3 view. From FIG. 3, stator 24 can be seen to have a winding pole pair number 2, the significance of which will be further apparent from the following description. Stator 24 can also be understood to include a permanent magnet pole pair number of 22, and a stator modulation pole pair number of 24. Machine systems according to the present disclosure will include stator winding pole pair numbers, rotor permanent magnet pole pair numbers, and stator modulation pole pair numbers according to the following equation $$P = |Z_{pm} - Z_s| \qquad \text{Eq. (1)}$$

Where p equals stator winding pole pair number, $Z_{pm}$ is the rotor pole pair number, and $Z_s$ is the stator modulation pole pair number. This general combination of parameters leads to many different suitable combinations, and for 3-phase winding configurations examples are as follows:

TABLE 1

Some feasible pole pair combinations for pole modulated PM generator

| p | $Z_{pm}$ | $Z_s$ |
|---|---|---|
| 1 | 8 | 9 |
| 1 | 11 | 12 |
| 2 | 22 | 24 |
| 2 | 16 | 18 |
| 3 | 24 | 27 |
| 3 | 12 | 15 |
| 4 | 8 | 12 |
| 4 | 14 | 18 |
| 4 | 20 | 24 |

Figure 11:
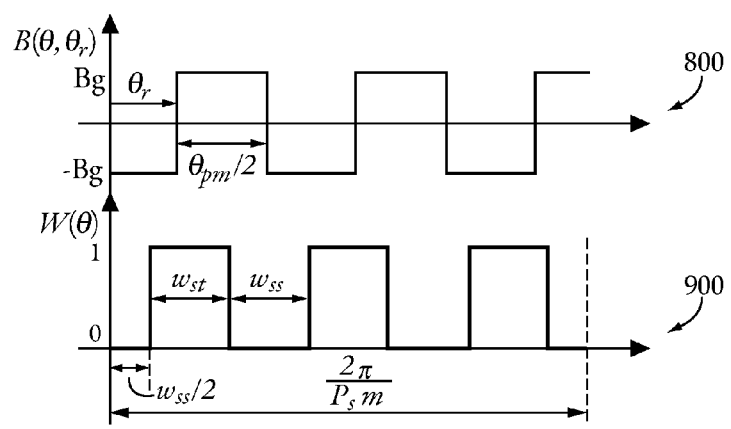
FIG. 11 is a diagram showing flux distribution and winding function.

Referring now to FIG. 11, there is shown flux distribution applied as the first order of permanent magnetic flux distribution in an air gap 40 between teeth 36 and permanent magnets 30, and the winding function. The winding function gives the simplified model to describe magnetic flux concentration with a specific modulation tooth design as will be further discussed herein. Flux linkage, where windings are mounted on each arm can be derived as in equation 2.

$$\varphi_p(\theta_y) = \int_0^{\frac{2\pi}{P_s m}} B(\theta, \theta_y) \cdot W(\theta) d\theta = \qquad \text{Eq. (2)}$$

$$\int_0^{\frac{2\pi}{P_s m}} \left\{ \frac{4}{\pi} \sum_{n=1,3,5\ldots}^{\infty} \frac{B_g}{n} \sin\left[\frac{2n\pi}{\theta_s} \cdot (\theta - \theta_y)\right] \right\} \cdot$$

$$\left\{ a_0 + \sum_{n=1}^{\infty} a_n \cos\left(\frac{2n\pi}{\theta_s} \cdot \theta\right) + \sum_{n=1}^{\infty} b_n \sin\left(\frac{2n\pi}{\theta_s} \cdot \theta\right) \right\} d\theta$$

This enables machine electromotive force (EMF) to be obtained by equation 3.

$$emf_p = N_s \frac{d\varphi_p(\theta_\gamma)}{dt} = N_s \frac{d\varphi_p(\theta_\gamma)}{d\theta_\gamma} \cdot \frac{d\theta_\gamma}{dt} = N_s \omega_\gamma \frac{d\varphi_p(\theta_\gamma)}{d\theta_\gamma} \quad \text{Eq. (3)}$$

It is has been discovered that applying an analytical approach to machine design parameters enables factors including modulation pattern of teeth 36 and ratio of slot opening of slots 42 to teeth 36 about stator 24 to be varied and the resulting effect on machine EMF determined. Another way to understand these principles is that by applying certain known relationships in a novel way to factors relating to tooth spacing and tooth to gap ratio provides for improved flux linkage and ultimately machine EMF. Conventional Vernier-type machines space the teeth and arms uniformly. Thus, while certain known designs appear to have experimented with different tooth profiles, tooth number, tooth spacing and arm spacing, such systems are not believed to present non-equal tooth and arm patterns so as to modulate flux linkage to pick-up magnetic flux that would be otherwise lost.

Figure 12:
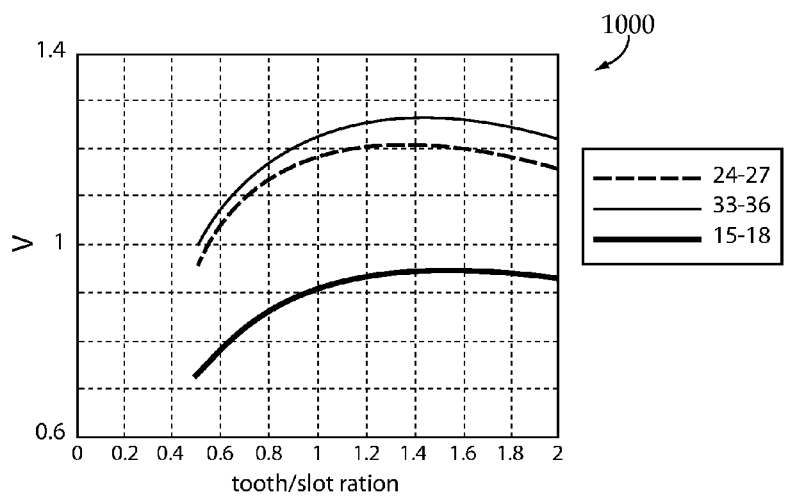
FIG. 12 is a tooth/slot ratio in comparison with induced voltage for several different rotor and stator assembly configurations, according to the present disclosure.

Referring to FIG. 12, there are shown machine EMFs with different rotor/stator pole pair numbers, and induced voltage in comparison with tooth/slot ratios. While there is variation in the induced voltage, a variation can be expected in the machine EMF. The general pattern of tooth to slot ratio providing for peak induced voltage from about 1.2 tooth to slot ratio to about 1.8 tooth to slot ratio is readily apparent.

Returning to FIG. 3, there is shown in the detailed enlargement an example variation in tooth spacing that might be used in the present disclosure. It should be appreciated that various other modulation patterns might be developed according to the present disclosure, and thus what is shown in FIG. 3 is purely illustrative. In certain embodiments a feature of the modulating patterns is the alignment of each tooth 24 on one arm 34 with respective magnet portions of the same polarity on rotor 26. In this way, the flux leakage experienced during operation of the machine is significantly reduced. It can nevertheless be seen that a relatively large tooth spacing 44 on one of arms 34 is associated with relatively small tooth spacings 46, the spacing between each arm 34 of the machine is not that same as the tooth spacing 46, and the spacing between each arm 34 may differ from the spacing between other arms 34 of the machine.

Figure 4:
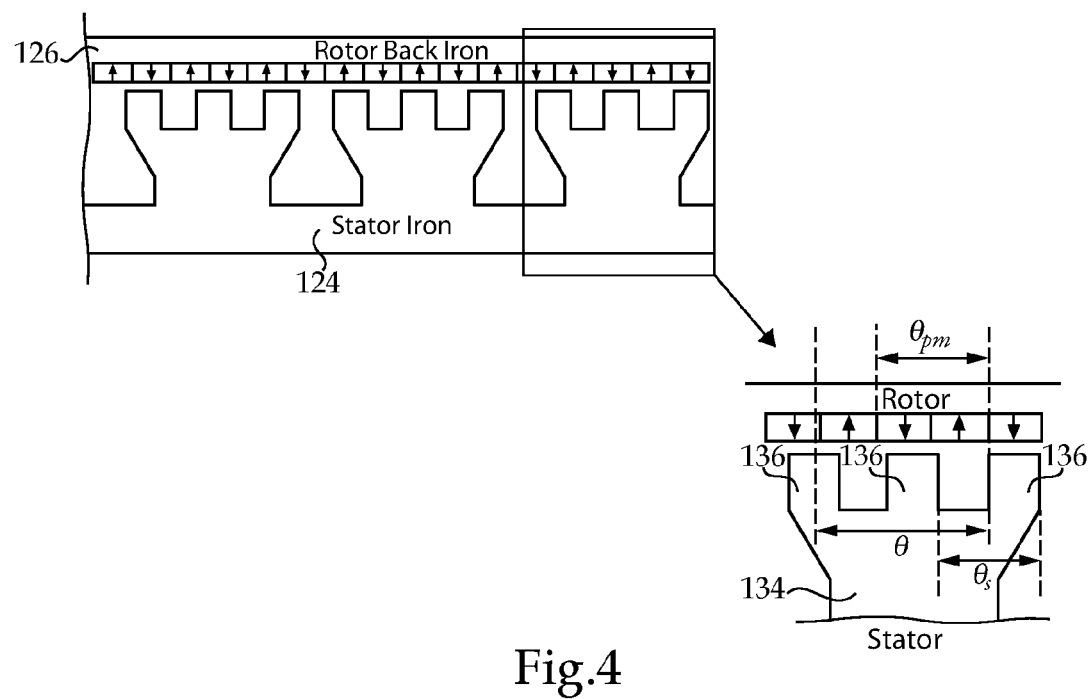
FIG. 4 is concept illustration of a linearized model of parts of the rotor and stator assembly of FIG. 2.

It shall be appreciated that the characteristic of various teeth or poles of the arms disclosed herein may include a number of features providing the spacing modulation and/or alignment disclosed herein, of which FIG. 3 provides one example. In certain embodiments, teeth or poles of each of a plurality of arms are spaced apart from one another according to a non-uniform pattern such that the teeth or poles of a given arm have substantially the same angular position relative to respective magnets radially opposite from the teeth or poles of the given arm structure. In certain embodiments the teeth on each arm are spaced such that when one tooth is aligned with one of the first plurality of permanent magnets, the remaining tooth or teeth of the arm are similarly aligned with other respective ones of the first plurality of permanent magnets. In certain embodiments, the teeth or poles on each arm are spaced such that when one of the teeth or poles is aligned with one of the first plurality of permanent magnets, the remaining tooth/teeth or pole(s) of the arm are similarly aligned with other respective ones of the first plurality of permanent magnets Referring also to FIG. 4, there is shown a simplified and linearized machine model for pole modulation, where stator 124 is shown in a linear form adjacent rotor 126 also in a linear form. A callout enlargement in FIG. 4 shows one of arms 134 wherein a plurality of teeth 136 are shown, and features related to tooth spacing that can be expected to affect flux linkage and thus machine EMF are identified. In FIG. 4, $\Theta$ identifies a spacing between the center of a trailing tooth and the end of a leading tooth. $\Theta_s$ identifies a distance from a front edge of a leading tooth to a front edge of a next adjacent tooth, whereas $\Theta_{pm}$ identifies a distance from a line between a pole pair and back edge of a leading tooth. These distances identified by characters $\Theta$, $\Theta_s$, and $\Theta_{pm}$ can be varied according to the present disclosure to develop a pole modulation pattern that optimizes flux linkage, machine EMF and other factors.

Figure 5:
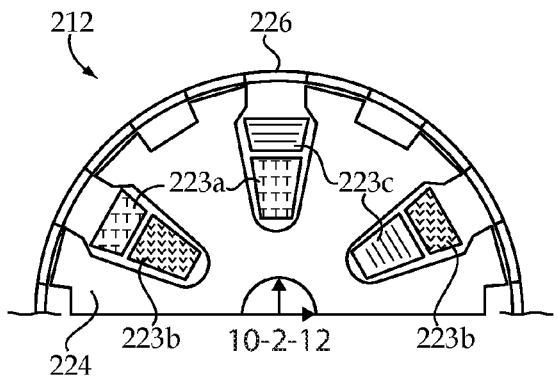
FIG. 5 is a diagrammatic illustration of an alternative arrangement of components in a rotor and stator assembly.
Figure 6:
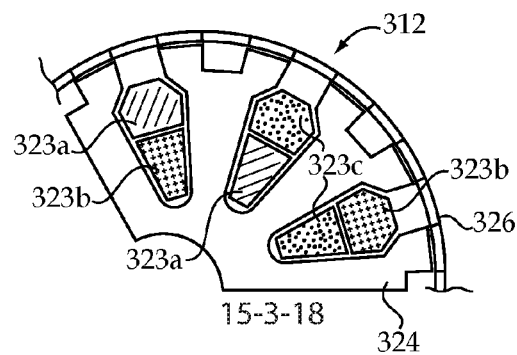
FIG. 6 is a diagrammatic illustration of another alternative arrangement of components of in a rotor and stator assembly.

Referring to FIG. 5, there is shown a portion of a machine 212 where a rotor 226 and a stator 224 are configured so as to have a winding pole pair number of 2, a rotor pole pair number of 10 and a modulation pole pair number of 12. Three phase windings 223a, 223b and 223c are arranged in a first exemplary winding scheme. In FIG. 6, a machine 312 including a rotor 326 and a stator 324 and which has a winding pole pair number of 3, a rotor pole pair number of 15 and a stator modulation pole pair number of 18. Three phase windings 223a, 223b and 223c are arranged in a first exemplary winding scheme. The embodiments in shown in FIGS. 5 and 6 provide two examples illustrating the flexibility and variation in the configurations suitable for use in the present disclosure.

Figure 7:
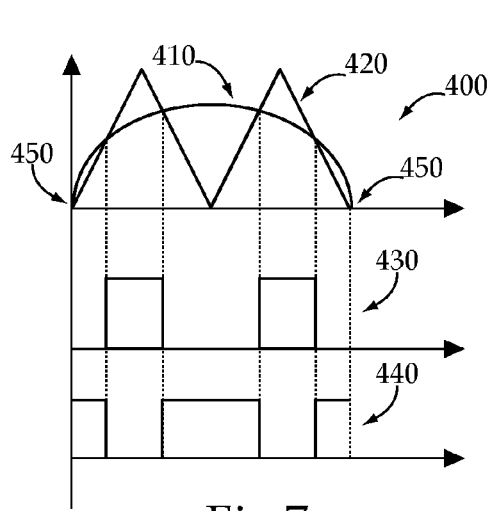
FIG. 7 is a concept diagram illustrating possible pole modulation patterns in an electrical machine.

Referring now to FIG. 7, there is shown a concept diagram 400 wherein a half cycle sinusoidal line 410 is shown superimposed on a triangular wave 420. Research has demonstrated that suitable modulation patterns, can be represented by the intersection points between line 410 and 420. A first modulation pattern 430 is shown in FIG. 7 and formed by drawing lines from the intersection points of line 410 and 420. A second modulation pattern 440 is demonstrated from the same two lines. Superimposed onto the linearized model depicted in FIG. 4, modulation patterns 430 and 440 would each provide actual sizing and spacing of teeth 36. Concept diagram 400, and in particular triangular wave 420 results from a stator pole pair number of 2. In other words, two triangles superimposed on a half sinusoid, with origins of the triangular wave 420 shown via numerals 450 and 460 being located at crossing points of line 410 through axis Y. The ratio of the amplitude the triangular wave 420 and the amplitude of the sinusoidal wave 410 may be varied as long as waves 410, 420 intersect.

Figure 8:
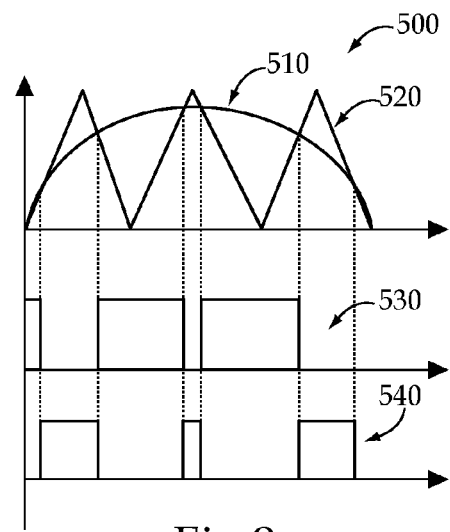
FIG. 8 is a concept diagram illustrating other possible pole modulation patterns.
Figure 9:
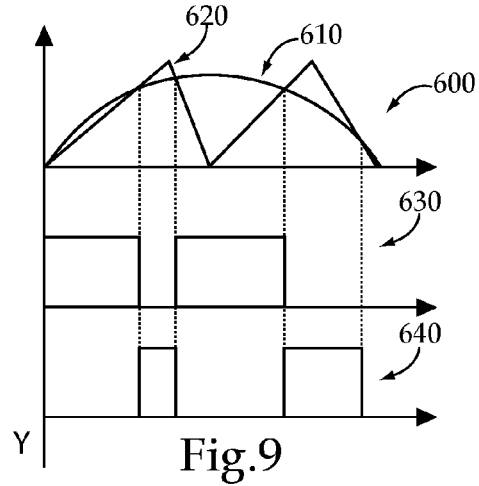
FIG. 9 is a concept diagram illustrating still other possible pole modulation patterns.

Referring to FIG. 8, there is shown another concept diagram 500 including another half sinusoidal wave 510 superimposed on a triangular wave 520 to produce two different suitable modulation patterns 530 and 540. Analogous to FIG. 7, modulation patterns 530 and 540 can be used to produce actual tooth spacing and sizing patterns in a linearized model. It will be noted that triangular wave 520 forms three triangles, determined by a winding pole pair number of 3. In FIG. 9, yet another chart 600 is shown that includes a half sinusoid 610 and a triangular wave 620 superimposed, to produce two different acceptable modulation patterns 630 and 640. It will be noted that the triangles formed by triangular waves 620 in FIG. 9 are not equilateral triangles, whereas the triangles formed by lines 420 and 520 are equilateral triangles. It should be appreciated that half sinusoidal waves 410, 510 and 610 are not strictly representative of a single factor in the physical world, nor are triangular waves 420, 520 and 620. The lines used to produce the concept diagrams of 400, 500 and 600 nevertheless represent geometric representations that are varied based upon certain physical properties of enhanced pole modulated machine systems according to the present disclosure.

Figure 10:
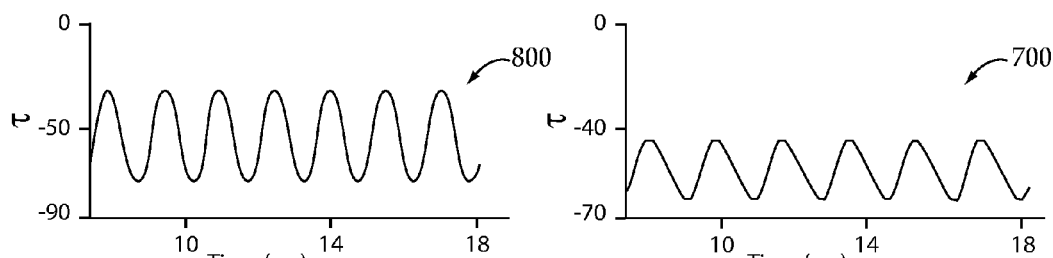
FIG. 10 illustrates differences in torque ripple between a conventional design and the present disclosure.

Referring to FIG. 10, as previously alluded to, each tooth on a stator winding arm pole in a Vernier-type machine is functioning as a flux collection element. This means that each tooth is contributing to torque production at the same time. According to the present disclosure, torque harmonics can be effectively synchronized with torque ripple components so as to cancel some of torque ripple. In FIG. 10, a design example for a machine according to the present disclosure is shown in signal trace 700, whereas a known design is shown in the plot at 800. At signal trace 800 represents a torque ripple with equally spaced modulation poles, whereas signal trace 700 represents torque ripple with non-equally spaced modulation poles.

Figure 13:
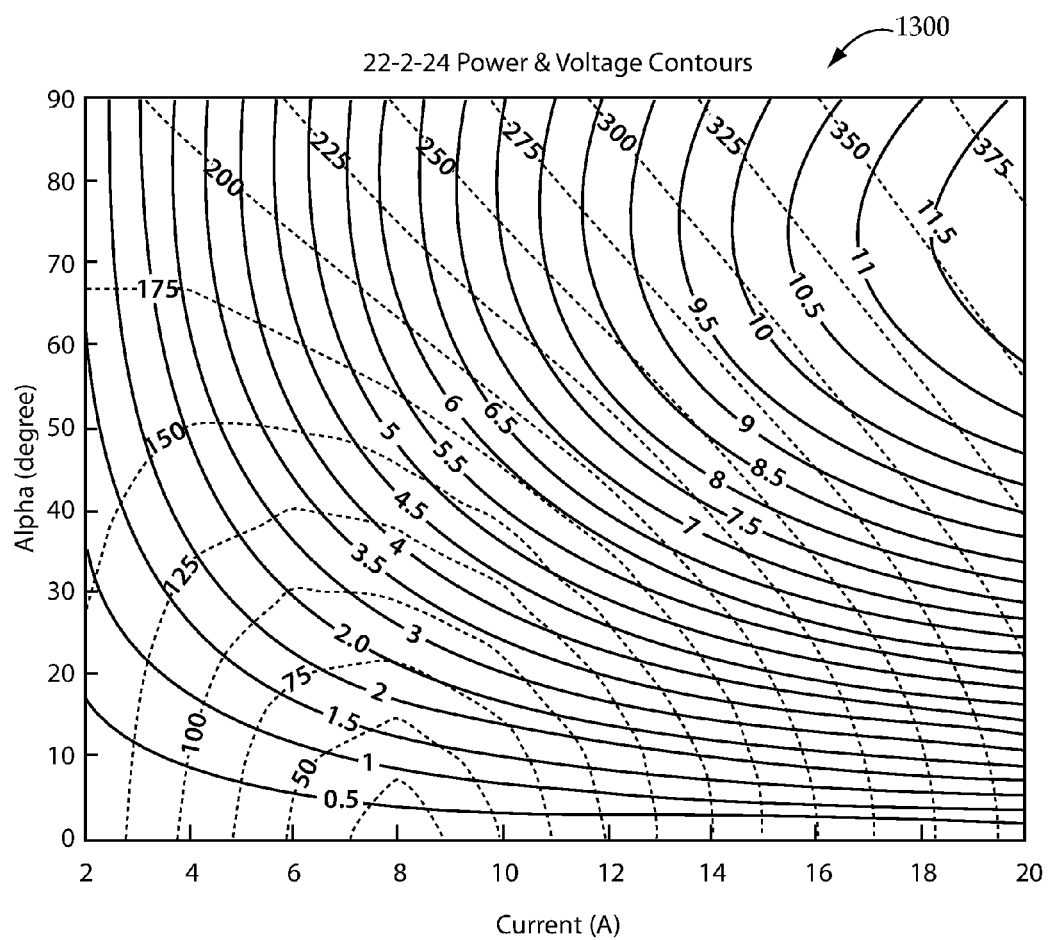
FIGS. 13 and 14 are graphs illustrating machine performance at various currents and control angles.

With reference to FIG. 13, there is a graph 1300 illustrating the varying power and voltage contours produced by varying the control current and control angle in an electric machine such as the exemplary machine of FIG. 1. The current amplitude is a primary variable for the generator as well as the current control angle alpha. The control angle, alpha, is defined as the current angle with respect to the D axis of the generator. In general, with increased current amplitude, the generator can be operated with higher power density. The generator output power can also be enhanced by manipulating the current angle, for a fixed current amplitude. The voltage characteristics also exhibit interesting phenomena of this type of generator design. With a phase current of 8 amps and current angle of 0 degree, a saddle point of the generator terminal voltage can be observed. This operation point is actually the PM flux cancellation state due to the stator side flux produced by the stator current, suggesting a potential wide speed range of operation.

With the overlaid voltage information, the rated operation point can be selected with properly configured stator phase windings. In this prototype design with the same outer diameter and increased stack length as the baseline machine, the potential generator design candidate can achieve 11 kW with a terminal voltage of 330 V as indicated in graph 1300.

Figure 14:
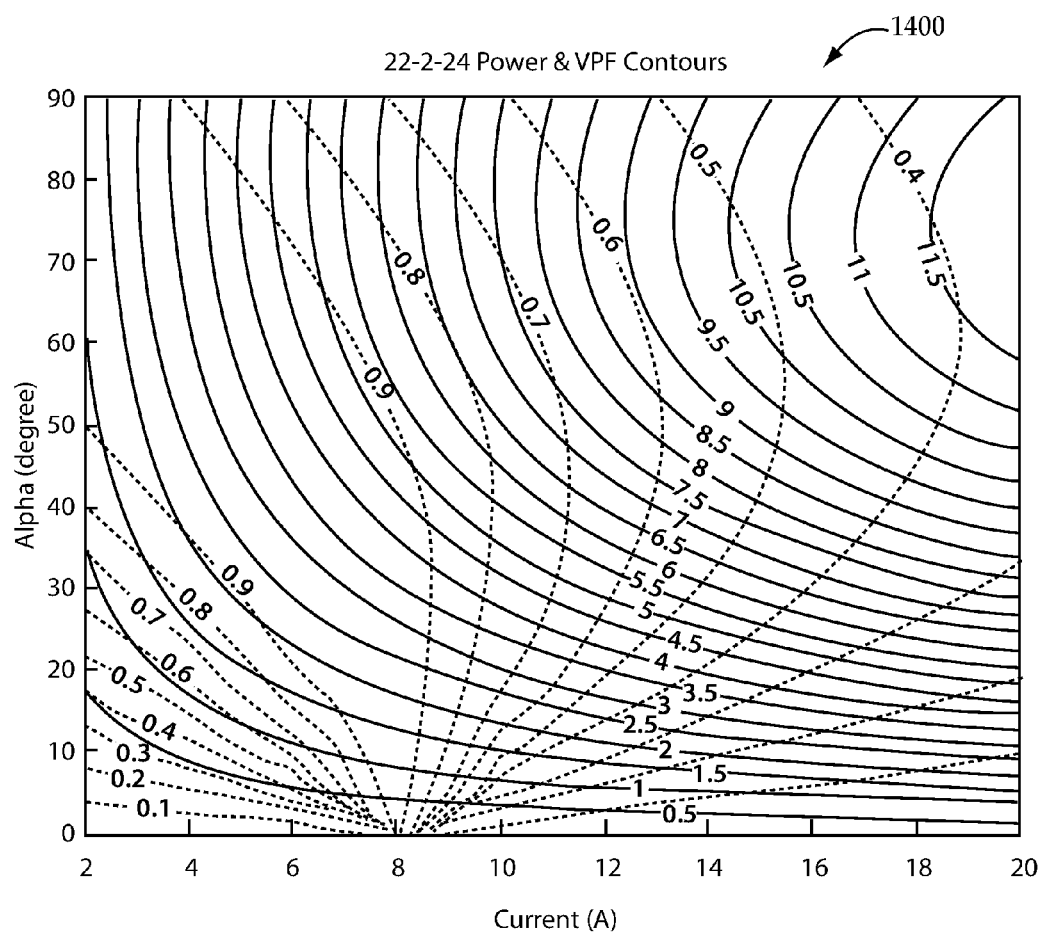

With reference to FIG. 14, there is a graph 1400 illustrating the varying power and power factor contours produced by varying the control current and control angle in an electric machine such as the exemplary machine of FIG. 1. the generator power factor characteristics with different load points are provided with the power output profile overlaid. Power factor primarily provides the evaluation method for the phase angle (φ) between generator output voltage and current, which is calculated as cos(φ) in general. With inductive loads, the current will lag behind the voltage. Power factor indicates the utilization of the current in terms of power conversion inside the generator. With higher power factor, the current will be lower for the same power generated.

As indicated in graph 1400, the prototype generator can be operated with a wide power factor range. It should be pointed out that the power factor suffers with increased power output. For instance, the power factor drops from 0.9 to 0.5 with the generator output power driven from 5 kW to 10 kW. With increased current, the pole modulated design exhibits higher flux leakage between the modulation poles as well as PM poles, which leads to higher voltage drop on the generator leakage inductance component. It should also be noted that the power factor is a leading angle with the increased power output, which offers another potential application feature with pole modulated generators as a power factor compensator.

Further written description of a number of exemplary embodiments shall now be provided. One embodiment is a Vernier machine comprising a rotor comprising a back portion and a plurality of permanent magnets arranged about a surface of the back portion such that adjacent ones of the permanent magnets have poles of the opposite polarity facing one another; and a stator comprising a plurality of ferromagnetic arm structures, a plurality of ferromagnetic pole structures extending from each of the ferromagnetic arm structures in a direction toward the permanent magnets, and a plurality of conductive windings disposed about respective ferromagnetic arm structures, the ferromagnetic pole structures structured to collect magnetic flux from the permanent magnets; wherein the ferromagnetic pole structures of each of said ferromagnetic arm structures are spaced apart from one another according to a non-uniform pattern such that the ferromagnetic pole structures of a given ferromagnetic arm structure have substantially the same angular position relative to the permanent magnets radially opposite from the ferromagnetic pole structures of the given ferromagnetic arm structure.

In certain forms of the foregoing machine, the rotor and the stator are structured as a variable reluctance machine. In certain forms, the rotor is structured to surround the stator. In certain forms, the spacing of the ferromagnetic pole structures is effective to increase flux collection of the ferromagnetic pole structures relative to the flux collection provided by a uniform spacing of the ferromagnetic pole structures. In certain forms, the ferromagnetic arm structures are spaced apart from one another according to a non-uniform pattern. In certain forms, the non-uniform pattern of the ferromagnetic pole structures corresponds to a modulation pattern resulting from inputting a sinusoid to a first input of a comparator and inputting a triangular waveform or a sawtooth waveform to a second input of the comparator. In certain forms, the spacing of the ferromagnetic pole structures is effective to synchronize torque harmonics with torque ripple components effective to mitigate torque ripple.

Another exemplary embodiment is an electrical machine comprising a rotor comprising a plurality of magnetic pole structures arranged about a rotor surface such that adjacent ones of the magnetic pole structures have poles of the opposite polarity facing one another; and a stator comprising a plurality of arm structures, a plurality of pole structures extending from each of the arm structures in a direction toward the permanent magnets, and a plurality of conductive windings disposed about respective arm structures, the pole structures being structured to collect magnetic flux from the permanent magnets; wherein the pole structures of each of said arm structures are arranged in a variable spacing pattern such that the pole structures of a given arm structure have a substantially uniform positional relationship relative to the magnetic pole structures opposite from the pole structures of the given arm structure.

In certain forms of the foregoing Vernier machine, the rotor and the stator are structured as a hybrid PM/VR machine. In certain forms, the stator is structured to surround the rotor. In certain forms, the arrangement of the pole structures is effective to increase flux collection of the pole structures relative to the flux collection provided by a uniform spacing of the pole structures. In certain forms, the arm structures are arranged in a variable spacing pattern. In certain forms, the pole structures of different ones of said arm structures have different positional relationships relative to the magnetic pole structures opposite from the pole structures of the given arm structure. In certain forms, the spacing of the pole structures is effective to synchronize torque harmonics with torque ripple components effective to mitigate torque ripple.

A further exemplary embodiment is a Vernier machine comprising a rotor comprising a support structure, a first plurality of permanent magnets, and a second plurality of permanent magnets, the rotor structured such that an alternating pattern of one of the first plurality of permanent magnets and one of the second plurality of permanent magnets is affixed to the inside of the support structure; and a stator comprising a plurality of arms extending toward the rotor, each arm including a plurality of teeth extending from the arm toward the rotor, wherein the teeth on each arm are spaced such that when one tooth is aligned with one of the first plurality of permanent magnets, the remaining tooth or teeth of the arm are similarly aligned with other respective ones of the first plurality of permanent magnets, and wherein the arms are arranged such that the spacing between a first set of the arms is substantially unequal to another spacing between a second set of the arms.

In certain forms of the foregoing Vernier machine, the machine is structured to function as a generator. In certain forms, a modulation pattern of the teeth on each arm is such that the width of the teeth is not equal to the spacing of the teeth. In certain forms, the modulation pattern of the teeth is structured to correspond to a comparison of one half of a sinusoidal wave to a triangular wave. In certain forms, the amplitude of the sinusoidal wave is less than the amplitude of the triangular wave. In certain forms, the frequency of the triangular wave is at least twice the frequency of the sinusoidal wave times the difference of the number of magnets in the first plurality of permanent magnets and the total number of teeth of the stator. In certain forms, the spacing of the teeth is determined by either the length of the portion of the sinusoidal wave greater than the triangular wave or the length of the portion of the sinusoidal wave less than the triangular wave. In certain forms, the amplitude of the sinusoidal wave is less than the amplitude of the triangular wave, the frequency of the triangular wave is at least twice the frequency of the sinusoidal wave times the difference of the number of magnets in the first plurality of permanent magnets and the total number of teeth of the stator, and the spacing of the teeth is determined by either the length of the portion of the sinusoidal wave greater than the triangular wave or the length of the portion of the sinusoidal wave less than the triangular wave. In certain forms, the spacing of the arms is structured so as to reduce torque ripple compared to a second Vernier machine having the same structure and characteristics of the Vernier machine except that the second Vernier machine has a uniform spacing of the arms. In certain forms, the spacing of the arms is structured so as to synchronize torque harmonics and torque ripple. In certain forms, the support structure of the rotor comprises a tubular support structure.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A Vernier machine comprising:
   a rotor comprising a back portion and a plurality of permanent magnets arranged about a surface of the back portion such that adjacent ones of the permanent magnets have poles of the opposite polarity facing one another; and
   a stator comprising a plurality of ferromagnetic arm structures, a plurality of ferromagnetic pole structures extending from each of the ferromagnetic arm structures in a direction toward the permanent magnets, and a plurality of conductive windings disposed about respective ferromagnetic arm structures, the ferromagnetic pole structures structured to collect magnetic flux from the permanent magnets;
   wherein the ferromagnetic pole structures of each of said ferromagnetic arm structures are spaced apart from one another according to a non-uniform pattern such that the ferromagnetic pole structures of a given ferromagnetic arm structure have substantially the same angular position relative to the permanent magnets radially opposite from the ferromagnetic pole structures of the given ferromagnetic arm structure.

2. The Vernier machine of claim 1 wherein the rotor and the stator are structured as a variable reluctance machine.

3. The Vernier machine of claim 1 wherein the rotor is structured to surround the stator.

4. The Vernier machine of claim 1 wherein the spacing of the ferromagnetic pole structures is effective to increase flux collection of the ferromagnetic pole structures relative to the flux collection provided by a uniform spacing of the ferromagnetic pole structures.

5. The Vernier machine of claim 1 wherein the ferromagnetic arm structures are spaced apart from one another according to a non-uniform pattern.

6. The Vernier machine of claim 1 wherein the non-uniform pattern of the ferromagnetic pole structures corresponds to a modulation pattern resulting from inputting a sinusoid to a first input of a comparator and inputting a triangular waveform or a sawtooth waveform to a second input of the comparator.

7. The Vernier machine of claim 1 wherein the spacing of the ferromagnetic pole structures is effective to synchronize torque harmonics with torque ripple components effective to mitigate torque ripple.

8. An electrical machine comprising:
   a rotor comprising a plurality of magnetic pole structures arranged about a rotor surface such that adjacent ones of the magnetic pole structures have poles of the opposite polarity facing one another; and
   a stator comprising a plurality of arm structures, a plurality of pole structures extending from each of the arm structures in a direction toward the permanent magnets, and a plurality of conductive windings disposed about respective arm structures, the pole structures being structured to collect magnetic flux from the permanent magnets;

wherein the pole structures of each of said arm structures are arranged in a variable spacing pattern such that the pole structures of a given arm structure have a substantially uniform positional relationship relative to the magnetic pole structures opposite from the pole structures of the given arm structure.

9. The electrical machine of claim 8 wherein the rotor and the stator are structured as a hybrid PM/VR machine.

10. The electrical machine of claim 8 wherein the stator is structured to surround the rotor.

11. The electrical machine of claim 8 wherein the arrangement of the pole structures is effective to increase flux collection of the pole structures relative to the flux collection provided by a uniform spacing of the pole structures.

12. The electrical machine of claim 8 wherein the arm structures are arranged in a variable spacing pattern.

13. The electrical machine of claim 8 wherein the pole structures of different ones of said arm structures have different positional relationships relative to the magnetic pole structures opposite from the pole structures of the given arm structure.

14. The electrical machine of claim 8 wherein the spacing of the pole structures is effective to synchronize torque harmonics with torque ripple components effective to mitigate torque ripple.

15. A Vernier machine comprising:
a rotor comprising a support structure, a first plurality of permanent magnets, and a second plurality of permanent magnets, the rotor structured such that an alternating pattern of one of the first plurality of permanent magnets and one of the second plurality of permanent magnets is affixed to the inside of the support structure; and
a stator comprising a plurality of arms extending toward the rotor, each arm including a plurality of teeth extending from the arm toward the rotor,
wherein the teeth on each arm are spaced such that when one tooth is aligned with one of the first plurality of permanent magnets, the remaining tooth or teeth of the arm are similarly aligned with other respective ones of the first plurality of permanent magnets, and
wherein the arms are arranged such that the spacing between a first set of the arms is substantially unequal to another spacing between a second set of the arms.

16. The Vernier machine of claim 15 wherein the machine is structured to function as a generator.

17. The Vernier machine of claim 15 wherein a modulation pattern of the teeth on each arm is such that the width of the teeth is not equal to the spacing of the teeth.

18. The Vernier machine of claim 17 wherein the modulation pattern of the teeth is structured to correspond to a comparison of one half of a sinusoidal wave to a triangular wave.

19. The Vernier machine of claim 18 wherein the amplitude of the sinusoidal wave is less than the amplitude of the triangular wave.

20. The Vernier machine of claim 18 wherein the frequency of the triangular wave is at least twice the frequency of the sinusoidal wave times the difference of the number of magnets in the first plurality of permanent magnets and the total number of teeth of the stator.

21. The Vernier machine of claim 18 wherein the spacing of the teeth is determined by either the length of the portion of the sinusoidal wave greater than the triangular wave or the length of the portion of the sinusoidal wave less than the triangular wave.

22. The Vernier machine of claim 18 wherein the amplitude of the sinusoidal wave is less than the amplitude of the triangular wave, the frequency of the triangular wave is at least twice the frequency of the sinusoidal wave times the difference of the number of magnets in the first plurality of permanent magnets and the total number of teeth of the stator, and the spacing of the teeth is determined by either the length of the portion of the sinusoidal wave greater than the triangular wave or the length of the portion of the sinusoidal wave less than the triangular wave.

23. The Vernier machine of claim 15 wherein the spacing of the arms is structured so as to reduce torque ripple compared to a second Vernier machine having the same structure and characteristics of the Vernier machine except that the second Vernier machine has a uniform spacing of the arms.

24. The Vernier machine of claim 15 wherein the spacing of the arms is structured so as to synchronize torque harmonics and torque ripple.

25. The Vernier machine of claim 15 wherein the support structure of the rotor comprises a tubular support structure.

* * * * *

UNITED STATES PATENT AND TRADEMARK OFFICE
CERTIFICATE OF CORRECTION

PATENT NO. : 9,985,483 B2  
APPLICATION NO. : 15/163364  
DATED : May 29, 2018  
INVENTOR(S) : Ouyang et al.

Page 1 of 1

It is certified that error appears in the above-identified patent and that said Letters Patent is hereby corrected as shown below:

On the Title Page

In item (74), Attorney, Agent, or Firm name "Taft Stettinius & Hollier" is incorrect and should be "Taft Stettinius & Hollister LLP".

Signed and Sealed this  
Fourteenth Day of August, 2018

Andrei Iancu  
*Director of the United States Patent and Trademark Office*